United States Patent
Lee et al.

(10) Patent No.: US 11,354,595 B2
(45) Date of Patent: Jun. 7, 2022

(54) SIMILARITY-BASED HIERARCHICAL DATA LOADING FOR MACHINE LEARNING TRAINING

(71) Applicant: International Business Machines Corporation, Armonk, NY (US)

(72) Inventors: Eun Kyung Lee, Bedford Corners, NY (US); Guojing Cong, Ossining, NY (US); Chih-Chieh Yang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 16/837,133

(22) Filed: Apr. 1, 2020

(65) Prior Publication Data

US 2021/0312316 A1    Oct. 7, 2021

(51) Int. Cl.
  *G06F 7/02*    (2006.01)
  *G06F 16/00*   (2019.01)
  *G06N 20/00*   (2019.01)
  *G06F 3/06*    (2006.01)

(52) U.S. Cl.
  CPC .......... *G06N 20/00* (2019.01); *G06F 3/0604* (2013.01); *G06F 3/0647* (2013.01); *G06F 3/0685* (2013.01)

(58) Field of Classification Search
  CPC ..... G06N 20/00; G06F 3/0604; G06F 3/0647; G06F 3/0685; G06F 16/00
  See application file for complete search history.

(56) References Cited

U.S. PATENT DOCUMENTS

| | | | |
|---|---|---|---|
| 10,303,978 | B1 | 5/2019 | Kang et al. |
| 2018/0025270 | A1 | 1/2018 | John et al. |
| 2018/0189607 | A1* | 7/2018 | Cocias ............... G06K 9/6256 |
| 2019/0188566 | A1* | 6/2019 | Schuster ............. G06N 3/08 |
| 2019/0244253 | A1 | 8/2019 | Vij et al. |
| 2019/0317952 | A1 | 10/2019 | Li et al. |
| 2020/0074273 | A1* | 3/2020 | Schmidt ............. G06N 3/0454 |

OTHER PUBLICATIONS

Meyer, T., et al., "MoDEL (Molecular Dynamics Extended Library): A Database of Atomistic Molecular Dynamics Trajectories", Structure, Nov. 10, 2010, pp. 1399-1409, vol. 18.

The Kubernetes Authors, "Pods", https://kubernetes.io/docs/concepts/workloads/pods/pod/, Last modified on Mar. 15, 2020, Accessed on Apr. 1, 2020, 10 pages.

* cited by examiner

*Primary Examiner* — Bruce M Moser
(74) *Attorney, Agent, or Firm* — Scully, Scott, Murphy & Presser, P.C.; Daniel P. Morris

(57) ABSTRACT

Original data for machine learning training can be received. The original data can be divided into baseline data and difference data. The baseline data and the difference data can be stored in different memory devices of the memory hierarchy associated with a computer, wherein the baseline data is stored in a first memory device having faster access speed than a second memory device in which the difference data is stored. The baseline data and the difference data can be loaded from the different memory devices. The original data can be reconstructed from the baseline data and the difference data. The reconstructed original data can be fed to a machine learning model to train the machine learning model.

20 Claims, 6 Drawing Sheets

SIMILARITY-BASED HIERARCHICAL DATA LOADING FOR MACHINE LEARNING TRAINING

BACKGROUND

The present application relates generally to computers and computer applications, and more particularly to machine learning.

Large-scale training may need parallel training to process big data. In some cases, training data, for example, big data cannot fit in a local node random access memory (RAM) or solid state device (SSD), but can be stored in a larger file system such as a shared disk file systems. Data loading can incur an overhead in computing.

BRIEF SUMMARY

Hierarchical data loading for machine learning can be provided. A computer-implemented method, in one aspect, can include receiving original data for machine learning training. The method can also include dividing the original data into baseline data and difference data. The method can further include storing the baseline data and the difference data in different memory devices in a memory hierarchy associated with a computer. The baseline data can be stored in a first memory device having faster access speed than a second memory device in which the difference data can be stored. The method can also include loading the baseline data and the difference data from the different memory devices. The method can further include reconstructing the original data from the baseline data and the difference data. The method can further include feeding the reconstructed original data to a machine learning model to train the machine learning model.

A system, in one aspect, can include a hardware processor and a plurality of memory devices in a memory hierarchy. The hardware processor can be configured to receive original data for machine learning training. The hardware processor can be further configured to divide the original data into baseline data and difference data. The hardware processor can be further configured to store the baseline data and the difference data in different memory devices of the memory hierarchy associated with a computer. The baseline data can be stored in a first memory device having faster access speed than a second memory device in which the difference data can be stored. The hardware processor can be further configured to load the baseline data and the difference data from the different memory devices. The hardware processor can be further configured to reconstruct the original data from the baseline data and the difference data. The hardware processor can be further configured to feed the reconstructed original data to a machine learning model to train the machine learning model.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Data loading pattern in machine learning training can be similar across different applications. In another aspect, high degrees of similarities may exist in specific groups of data (e.g., Molecular Dynamics (MD) simulation data and video frames). Improving the data loading or storage method can improve overall performance in machine learning or training a machine learning model.

A system, method and technique are provided which can load, save or store series of data (e.g., similar data) to and from devices in different memory hierarchy. In an embodiment, the system, method and technique (generally referred to herein as a methodology for simplicity of explanation), can divide or separate data in a pre-processing stage, for example, of a machine learning process. Data, for example, is used in training a machine learning model. The methodology can divide the data into baseline data and difference data. Separating the data into baseline and difference data can remove redundancies in the data, which may exist, and reduce the data size. In an embodiment, the methodology stores or loads the baseline data in a higher (or faster) memory hierarchy than the difference data or in the same memory hierarchy as the difference data; the methodology stores or loads the difference data in a lower (or slower) memory hierarchy than the baseline data or in the same memory hierarchy as the baseline data. The methodology can also include loading the baseline data and the difference data from their respective memory hierarchy and combining them to reconstruct the original data for training.

By way of example, data such as Molecular Dynamics (MD) trajectory can contain hundreds of frame data with high similarity. Tens of thousands of MD trajectories can be generated and analyzed using machine learning algorithms. As another example, high definition (HD) video frames (e.g., 1,920×1,080), 4 k (e.g., 3,840×2,160) video frames, 8 k (e.g., 7,680×4,320) video frames can be analyzed using machine learning algorithms in high-resolution video analysis.

Figure 1:
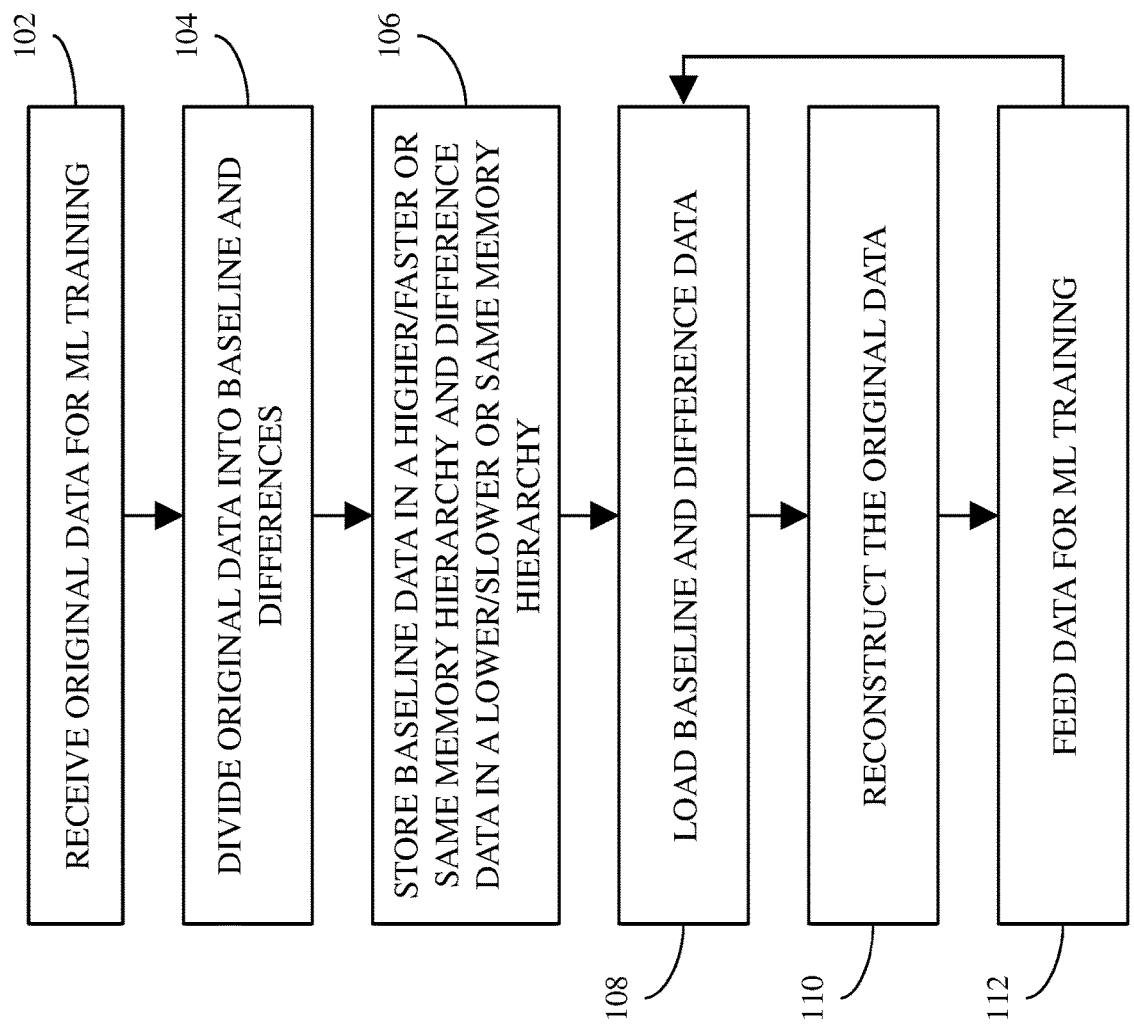
FIG. 1 is a flow diagram illustrating a method in one embodiment.

FIG. 1 is a flow diagram illustrating a method in one embodiment. The method can be executed by one or more computer components, for instance, implemented and/or run on one or more processors or hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

At 102, data, e.g., referred to as original data, for machine learning training is received. For example, the original data is fed for machine learning training. The data can be ground truth data for training a machine learning model. The original data, for example, can be stored on a file system disk, for example, using a file system management tool. By way of example, the original data may be stored in a shared-disk file system, which may use a storage area network (SAN).

At 104, the original data is separated or divided into baseline data and difference data. Techniques such as heuristics, statistical, or machine learning methods (e.g., mean, median, clustering, auto encoder) can be used to determine baseline data from the original data. In an embodiment, the baseline data is determined such that the difference data becomes sparse as possible, or reduced as possible. In an embodiment one baseline can be used for one or more number of difference data. For example, a baseline can be mapped into one or more number of difference data for reconstruction. There may be one or more baseline data. The number of baseline data can be decided depending on the data. For example, if all the frames in the original data are similar, only a few baseline data can be used. If there are no similarities among data, n number of baseline can be used, where n=number of data. The number of baseline data can be flexible. For example, if the original data can be seen as two normal distributions with different mean values, there can be two different baseline data. In this case, there are two groups of similar data in the original data set. In an aspect, defining the similarity (e.g., based on normal distribution), the number of baseline data, and the difference data can be configured or defined by a user.

At 106, the method can include storing the baseline data in a higher (or faster) memory hierarchy or in the same memory hierarchy, and storing the difference data in a lower (or slower) memory hierarchy or in the same memory hierarchy of a computer's memory. Where to store the data can depend on the latency and bandwidth of the memory devices in the memory hierarchy.

At 108, the method can include loading the baseline data and the difference data. From the different memory hierarchy, where the baseline and difference data is stored, the baseline and difference data are loaded to a location in the higher memory hierarchy for reconstruction. Such location can, for example, be a random access memory (RAM).

At 110, the baseline and difference data are reconstructed into the original data.

At 112, the reconstructed data (e.g., loaded in RAM) is fed into a machine learning algorithm for machine learning model training.

In an embodiment, the processing at 108, 110, and 112 can be done for every epoch of machine learning training. The processing at 108, 110, and 112, thus can repeat or loop for multiple epochs, for example, tens or hundreds of epochs.

Figure 2:
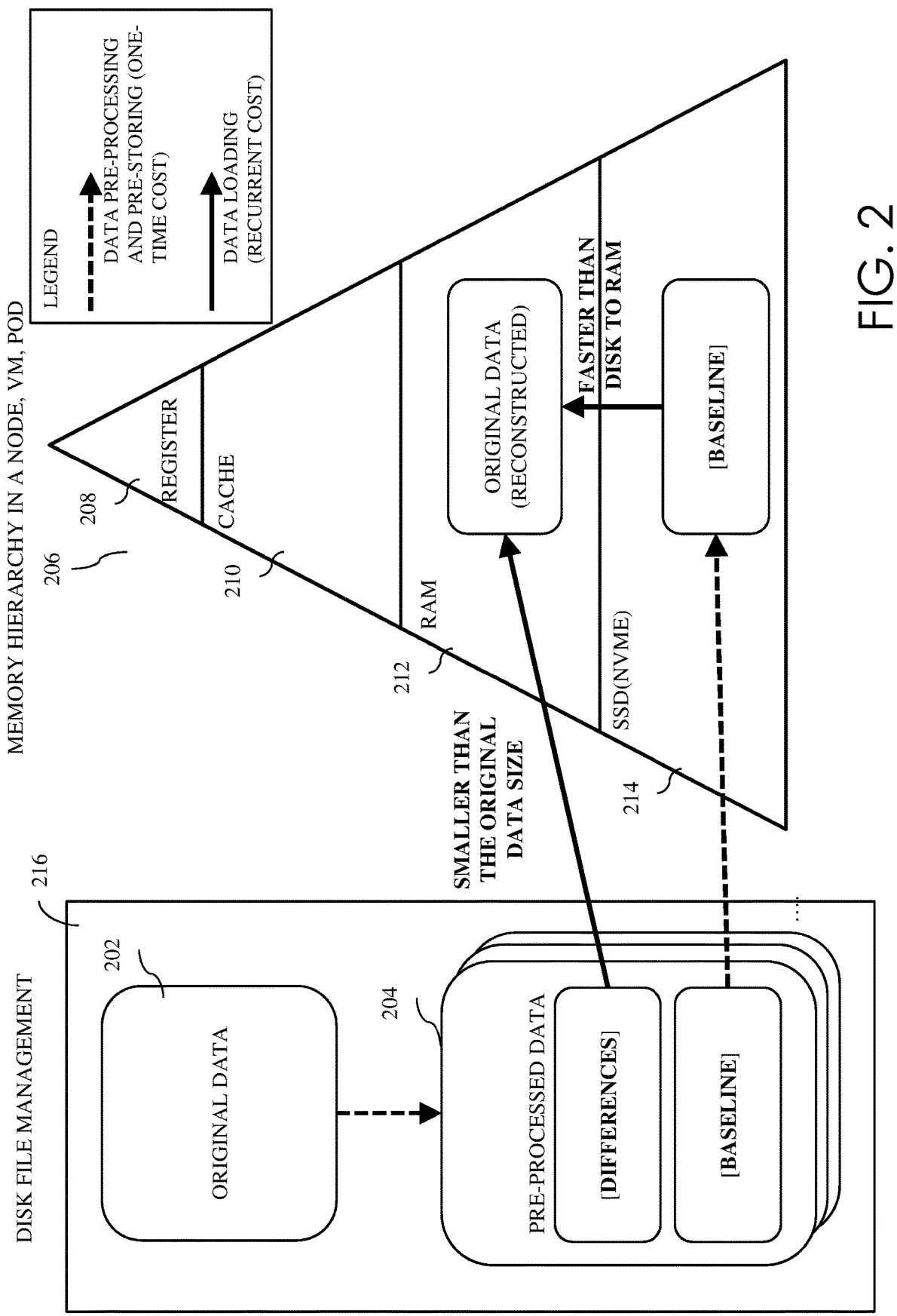
FIG. 2 is a diagram illustrating hierarchically data storing and loading in an embodiment.

FIG. 2 is a diagram illustrating hierarchical data storing and loading in an embodiment. Original data 202 can include data used in machine learning, for example, training a machine learning model, and for example, can be stored on a file system disk, for example, using a file system management tool. By way of example, the original data may be stored in a shared-disk file system, which may use a storage area network (SAN) 216 or another disk.

The original data can be pre-processed into pre-processed data 204, which includes the original data divided into baseline data and difference data. The size of the difference data can be much less than the original data size. Memory hierarchy, e.g., in a computer node (e.g., a server, a computing hardware), virtual machine (VM), or POD, is shown at 206. POD refers to a group of one or more containers with shared storage and/or network and a specification of how to run the containers. The hierarchy 206 shows different types of memory devices in the order of memory speed, e.g., their speed of access. For example, among the devices shown in 206, a register 208 is at the top of the hierarchy and has the fastest speed. A cache 210 is shown in the next level of the hierarchy with the next fastest speed. RAM 212 is shown after the cache 210, and solid state drive (SSD) (e.g., non-volatile memory express (NVMe)) 214 is shown. Next, there can be a local hard disk drive (not shown). Still next in the hierarchy may be a file system disk storage, e.g., a shared-disk file system storage 216. In an embodiment, the baseline data can be stored in the SSD 214. The difference data can be stored on a disk, for example, with a shared-disk file system. SSD 214 is characterized by faster speed of access than the shared-disk file storage 204. Different devices in a memory hierarchy (e.g., registers, cache, scratchpad memory, RAM, SSD, NVMe, hard disk) exhibit different performance levels for different devices in a memory hierarchy.

In an embodiment, for training a machine learning model, the baseline data stored in SSD 214 (higher in the memory hierarchy than where the difference data is stored) is loaded to RAM 212, and the difference data stored on a disk 216 (lower in the memory hierarchy than where the baseline data is stored) is loaded to RAM 212. Copying data from SSD to RAM can be more than 10 times faster than copying data from a disk to RAM. The baseline and the difference data loaded to RAM 212 are used to reconstruct the original data. The original data is fed to a machine learning algorithm to train a machine learning model. In an embodiment, reconstruction overhead can be kept minimal. For example, reconstructing the baseline and the difference data to original has less overhead than copying the entire or all of original data.

In another embodiment, the baseline and difference data can be stored in the same memory hierarchy.

Figure 3:
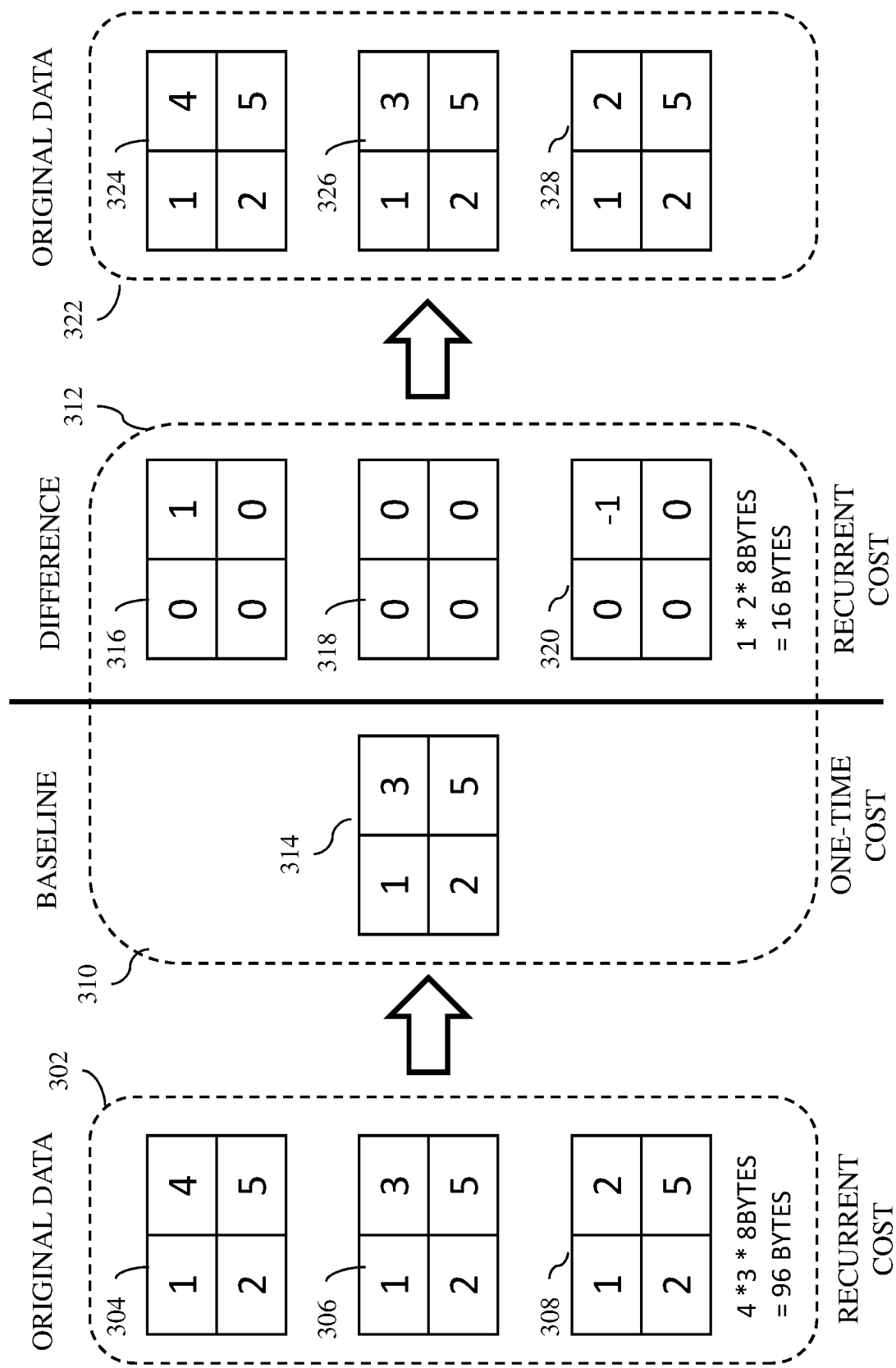
FIG. 3 shows examples of baseline and difference data in an embodiment.

FIG. 3 shows examples of baseline and difference data in an embodiment. An example of original data 302 may include a data set 304, 306 and 308 to train a machine learning model. By way of example, the data set can include multiple 8 bytes representing floating point numbers. The original data 302 is divided into baseline 310 and difference 312 data. Baseline 310 can be determined such that a baseline 314 can serve to represent multiple difference data. For instance, baseline 314 can include commonalities among the difference 312 data. As another example, baseline 314 can include a common factor which can be used to reconstruct multiple difference data. For example, the baseline data 314 can map to 3 difference data (e.g., each of the data set) 316, 318 and 320. By way of example, a baseline can be chosen that renders the difference data as sparse as possible. Data size can decrease with higher sparsity. For example, the size of the difference data at 316 is 8 bytes, the size of the difference data at 318 is 0 bytes, and the size of the difference data at 320 is 8 bytes. The higher the sparsity, the smaller the file or data size, and hence, there is less data to load. The baseline data 312 which may be stored in higher or faster memory hierarchy than where the difference data 316, 318, 320 are stored, and the difference data 316, 318, 320, which may be stored in lower or slower memory hierarchy than where the baseline data 312 is stored, can be loaded to RAM to be reconstructed as the original data 322. Reconstructing the based and difference data can include combining, e.g., adding the baseline and difference data, for example, as adding the floating point numbers. For instance, the baseline 314 can be added with the difference 316 to reconstruct original data at 324; the baseline 314 can be added with the difference 318 to reconstruct original data at 326; and the baseline 314 can be added with the difference 320 to reconstruct original data at 328. Any other dividing and reconstruct algorithm can be used.

Considering that copying baseline (e.g., from SSD to RAM) is negligible, total overhead for copying original data (48 bytes) in the instant methodology in an embodiment can be 16 bytes (=17%). For example, 8 bytes to represent a floating number. In an embodiment, baseline can be determined using heuristics, statistical, or machine learning methods (e.g., mean, median, clustering, auto encoder). In an embodiment, data can be compressed by a compression algorithm (e.g., moving picture expert group (MPEG) format data) can be considered a good candidate for the methodology in an embodiment.

Figure 4:
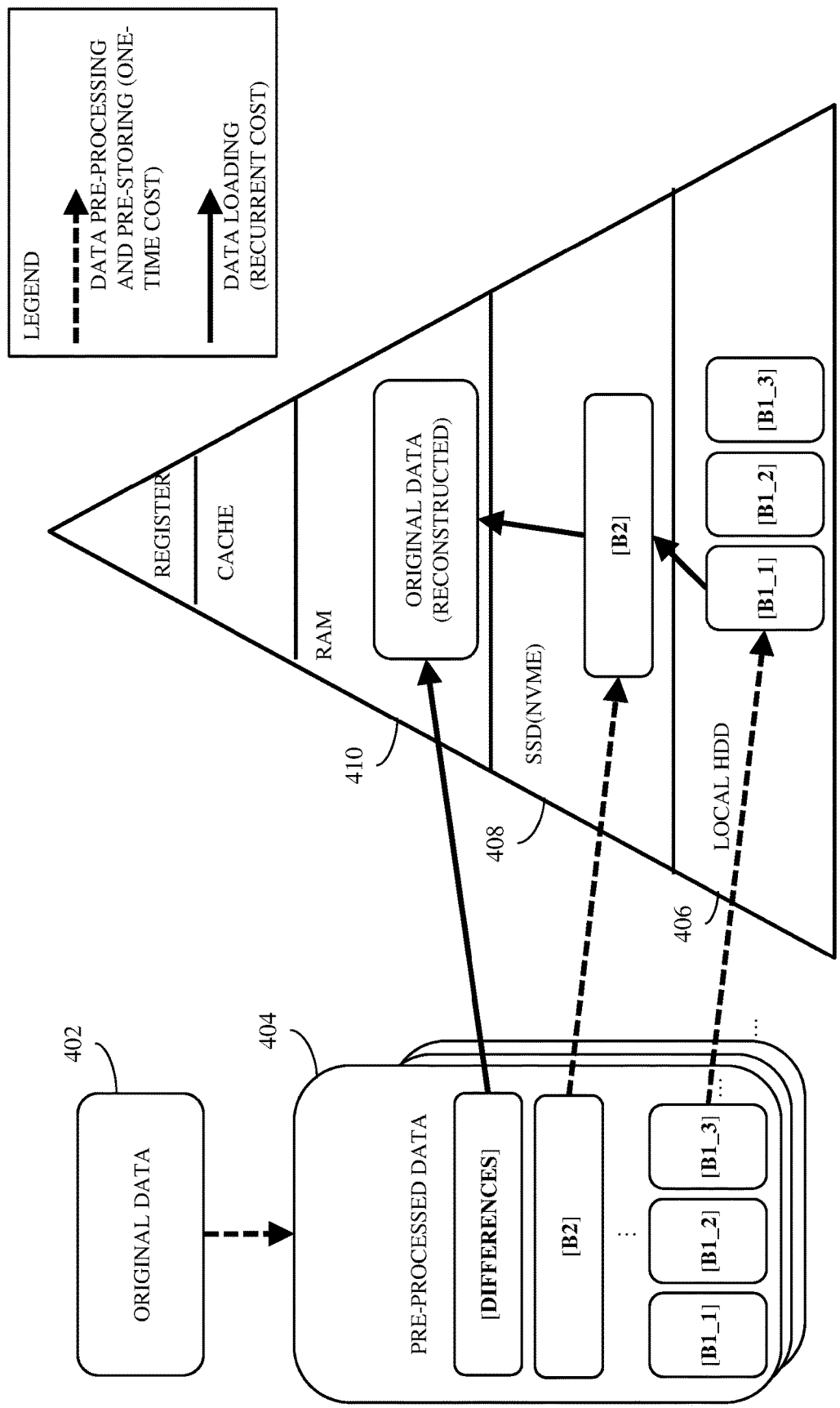
FIG. 4 is a diagram illustrating multiple baseline and differences data in an embodiment.

In an embodiment, there may be multiple of baselines and differences data. FIG. 4 is a diagram illustrating multiple baseline and differences data in an embodiment. For instance, depending on the data type, baseline ("B") can be multiple entities. Original data 402 can be pre-processed into multiple difference data and multiple baseline data ("B2") and ("B1_1", "B1_2", "B1_3") 404. For example, there can be three different baselines for the baseline data forming 3 clusters. B1_1, B1_2, B1_3, and B2 can be stored in different memory hierarchy, for example, if "B" cannot fit in a memory device. For example, B1s can be stored in a local hard disk drive 406 and B2 can be stored in SSD 408. B1s from a device 406 in a memory hierarchy, B2 from a device 408 in the memory hierarchy, and the difference data can be loaded to RAM 410 or another faster or higher memory device in the memory hierarchy, and reconstructed into original data. The reconstructed original data can be fed to a machine learning algorithm for training a machine learning model.

Figure 5:
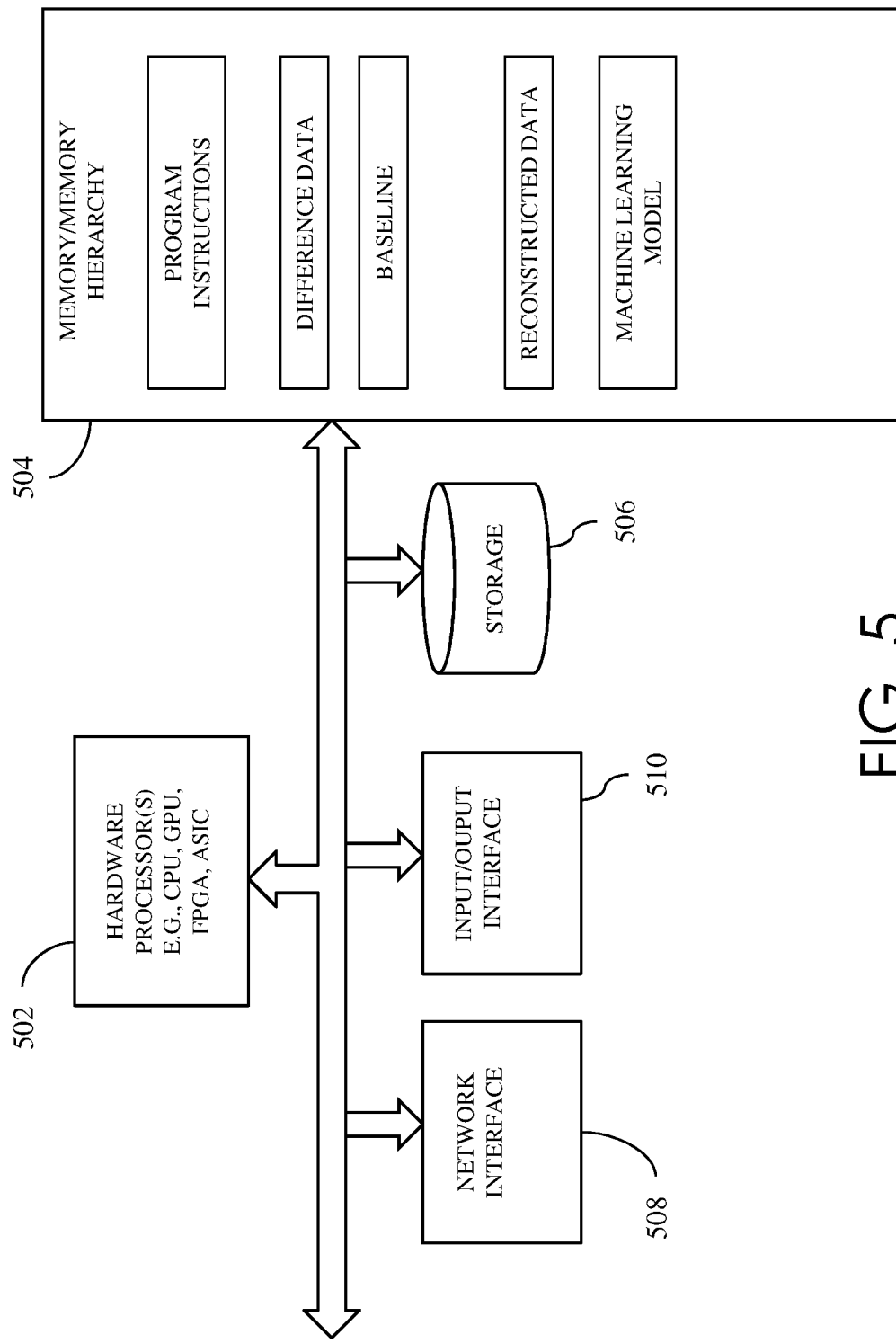
FIG. 5 is a diagram showing components of a system in one embodiment that can perform a similarity-based hierarchical data loading for machine learning training.

FIG. 5 is a diagram showing components of a system in one embodiment that can perform a similarity-based hierarchical data loading for machine learning training. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 604, and generate a prediction model and recommend communication opportunities. A memory device 504 may include random access memory (RAM), read-only memory (ROM) or another memory device, and may store data and/or processor instructions for implementing various functionalities associated with the methods and/or systems described herein. The memory device 504 may also represent a hierarchy of memory devices. One or more processors 502 may execute computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may receive input, which may include original data for training a machine learning model, for example, ground truth data. For instance, at least one hardware processor 502 may divide the original data into baseline data and difference data. In one aspect, the original data can be stored in a storage device 506 or received via a network interface 508 from a remote device, and may be temporarily loaded into a memory device 504 for generating the baseline and difference data. In an embodiment, the generated baseline data can be stored in a memory device of a computing node, which is in a higher hierarchy (faster) than where the difference data is stored. In an embodiment, the difference data and the baseline data can be loaded to a memory device such as a RAM of a computing node on which a machine learning model is being trained, and used to train the model. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Figure 6:
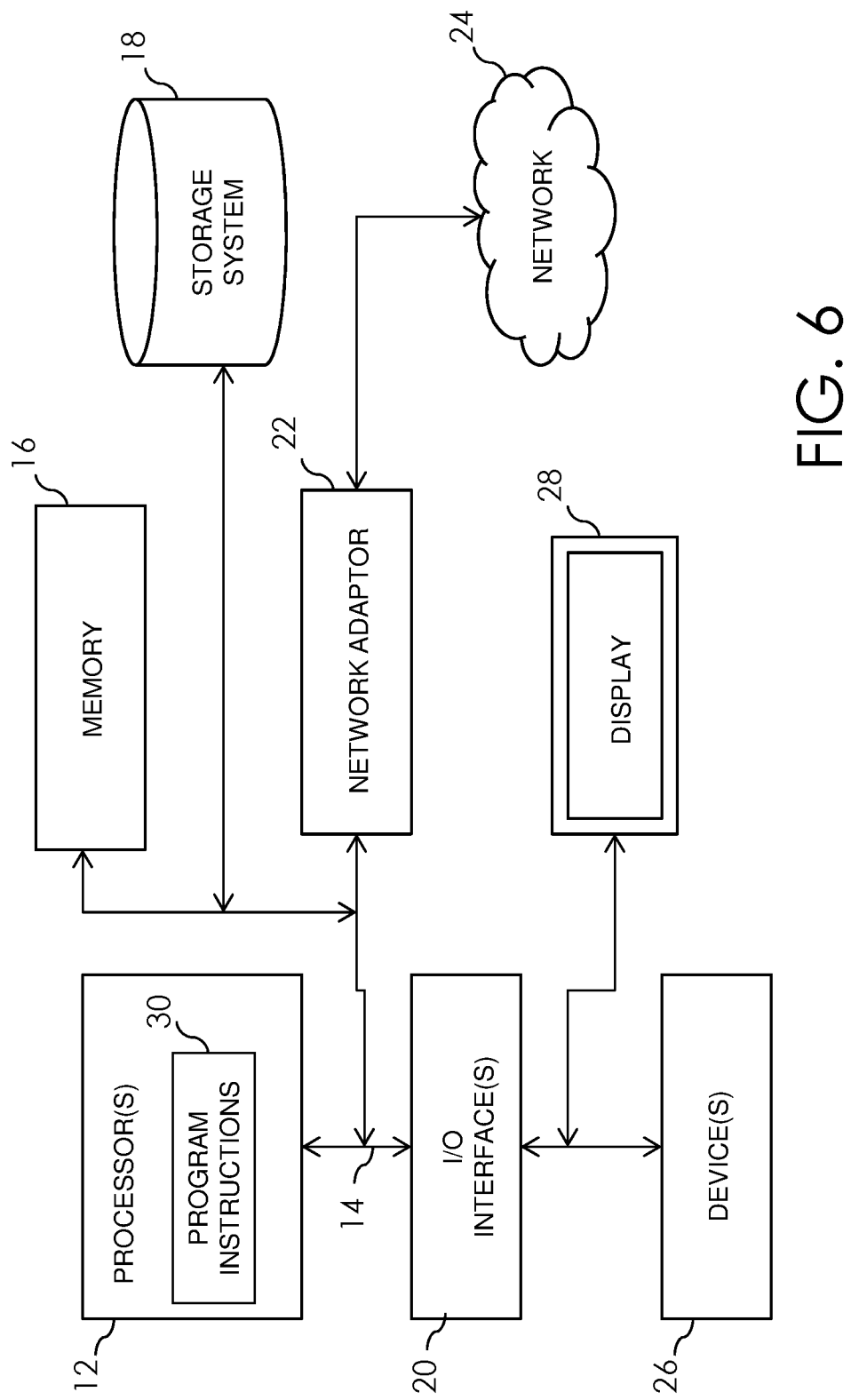
FIG. 6 illustrates a schematic of an example computer or processing system that may implement a system in one embodiment of the present disclosure.

FIG. 6 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   receiving original data for machine learning training;
   dividing the original data into baseline data and difference data;
   storing the baseline data and the difference data in different memory devices in a memory hierarchy associated with a computer, wherein the baseline data is stored in a first memory device having faster access speed than a second memory device in which the difference data is stored;
   loading the baseline data and the difference data from the different memory devices;
   reconstructing the original data from the baseline data and the difference data; and
   feeding the reconstructed original data to a machine learning model to train the machine learning model.

2. The method of claim 1, wherein the baseline data and the difference data are loaded from the different memory devices into a random access memory (RAM).

3. The method of claim 1, wherein the loading, reconstructing and feeding are performed repeatedly for multiple epochs of machine learning training data.

4. The method of claim 1, wherein the reconstructing the original data from the baseline data and the difference data includes combining the baseline data and the difference data.

5. The method of claim 1, wherein the baseline data is loaded to a location in higher memory hierarchy than the first memory device.

6. The method of claim 1, wherein the difference data is loaded to a location in higher memory hierarchy than the second memory device.

7. The method of claim 1, wherein the baseline data includes multiple baseline data and the multiple baseline data are stored in different memory devices of the memory hierarchy.

8. A computer program product comprising a computer readable storage medium having program instructions embodied therewith, the program instructions executable by a device to cause the device to:
   receive original data for machine learning training;
   divide the original data into baseline data and difference data;
   store the baseline data and the difference data in different memory devices in a memory hierarchy associated with a computer, wherein the baseline data is stored in a first memory device having faster access speed than a second memory device in which the difference data is stored;
   load the baseline data and the difference data from the different memory devices;
   reconstruct the original data from the baseline data and the difference data; and feed the reconstructed original data to a machine learning model to train the machine learning model.

9. The computer program product of claim 8, wherein the baseline data and the difference data are loaded from the different memory devices into a random access memory (RAM).

10. The computer program product of claim 8, wherein the device is caused to load, reconstruct and feed repeatedly for multiple epochs of machine learning training data.

11. The computer program product of claim 8, wherein the device is caused to combine the baseline data and the difference data to reconstruct the original data from the baseline data and the difference data.

12. The computer program product of claim 8, wherein the baseline data is loaded to a location in higher memory hierarchy than the second memory device.

13. The computer program product of claim 8, wherein the difference data is loaded to a location in higher memory hierarchy than the second memory device.

14. The computer program product of claim 8, wherein the baseline data includes multiple baseline data and the multiple baseline data are stored in different memory devices of the memory hierarchy.

15. A system comprising:
a hardware processor;
a plurality of memory devices in a memory hierarchy;
the hardware processor configured to at least:
receive original data for machine learning training;
divide the original data into baseline data and difference data;
store the baseline data and the difference data in different memory devices of the memory hierarchy associated with a computer, wherein the baseline data is stored in a first memory device having faster access speed than a second memory device in which the difference data is stored;
load the baseline data and the difference data from the different memory devices;
reconstruct the original data from the baseline data and the difference data; and
feed the reconstructed original data to a machine learning model to train the machine learning model.

16. The system of claim 15, wherein the baseline data and the difference data are loaded from the different memory devices into a random access memory (RAM).

17. The system of claim 15, wherein the hardware processor is configured to load, reconstruct and feed repeatedly for multiple epochs of machine learning training data.

18. The system of claim 15, wherein the hardware processor is configured to combine the baseline data and the difference data to reconstruct the original data from the baseline data and the difference data.

19. The system of claim 15, wherein the baseline data is loaded to a location in higher memory hierarchy than the first memory device.

20. The system of claim 15, wherein the baseline data includes multiple baseline data and the multiple baseline data are stored in different memory devices of the memory hierarchy.

* * * * *